United States Patent Office 2,966,916
Patented Jan. 3, 1961

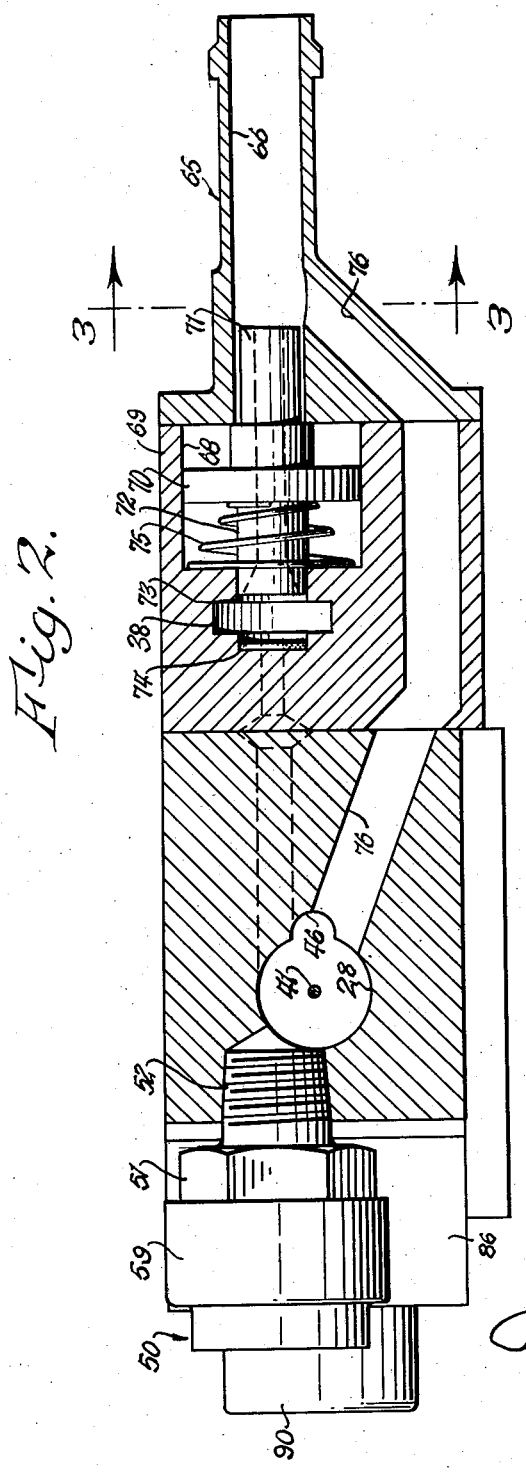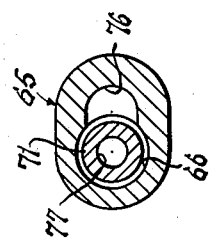

2,966,916

VALVE RESPONSIVE TO CHANGES IN SPEED

Richard D. Cummins, Tonawanda, N.Y., assignor to Firewel Development Company, Buffalo, N.Y., a co-partnership Filed July 1, 1957, Ser. No. 669,333

14 Claims. (Cl. 137—39)

This invention relates to the so-called gravity valve used in conjunction with the suits of aviators to apply external pressure to the lower part of the body to counteract the build up of blood pressure in sudden deceleration as when pulling out of a dive. The valve is actuated by a spring loaded weight having limited movement responsive to acceleration or deceleration of the airplane.

In pulling out of a dive the blood of the aviator is driven toward the lower extremities and forces are imposed on the abdominal organs which require restraint. The force imposed is measured in units of gravity and the restraint is accomplished by inflatable bladders or capstans inside or outside the aviator's suit and constructed to draw or press against the lower extremities of the body or torso of the aviator in response to a gravity valve which pressurizes the bladder or capstans proportionately to the number of gravities imposed on the aviator.

One of the objects of the present invention is to provide such a gravity valve which is extremely light in weight, this being accomplished by providing a movable weight which is very light as compared with the weights in gravity valves now in use and at the same time is positive and reliable in its action.

Another object is to provide such a gravity valve which is rapid in its response, both in pressurizing the bladder of the suit and also in dumping the pressurized gas from the bladder when no longer needed.

Another object is to render the gravity valve partially self-energizing but always under control.

Another object is to cut off the flow of gas when the bladder has been pressurized to its maximum extent thereby to avoid waste of gas.

Another object is to prevent waste of gas in the event the weight sticks.

Another object is to provide such a gravity valve operating through small diameter lines, thereby to avoid the necessity for cumbersome flexible tubes attached to the aviator.

Another object is to provide such a gravity valve which can be operated manually.

Other objects and advantages of the invention will be apparent from the following description and drawings in which, Fig. 1 is a central longitudinal section through a gravity valve embodying the present invention.

Fig. 2 is a section taken generally on line 2—2, Fig. 1.

Fig. 3 is a section taken generally on line 3—3 in Fig. 2.

Figure 1:
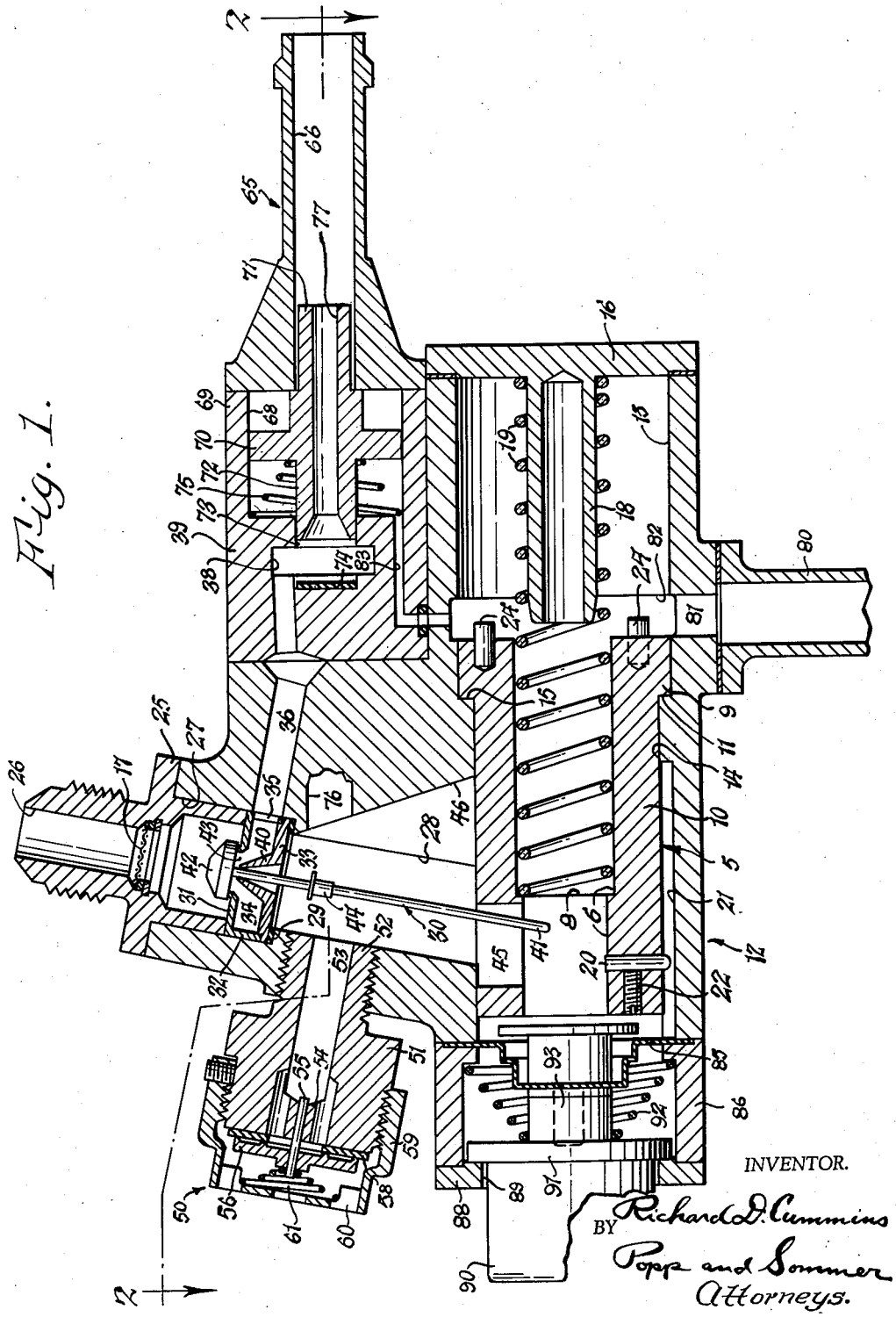

The gravity valve of the present invention is actuated in response to the yieldingly resisted free sliding movement of a weight indicated generally at 5. For lightness this weight is in the form of a sleeve having a through bore 6 which is of larger diameter at one end than the other so as to provide an axially facing internal annular shoulder 8 within the bore 6. The sleeve 5 is also provided at one end with an enlarged cylindrical head 9, this head forming, with the body 10 of reduced diameter, an axially facing small-size piston face or area 11. This small sized piston area is an important feature of the present invention in providing a very high weight to area ratio with a light weight cylinder.

The sleeve-weight 5 is slidingly fitted in a valve body 12 which is provided for this purpose with a large bore 13 fitting the enlarged head 9 and with a smaller bore 14 fitting the reduced body 10, thereby to provide an annular shoulder 15 opposing the reduced piston face or area 11.

This annular shoulder 15 faces a removable end head 16 secured, in any suitable manner, to the open end of the larger bore 13. This end head 16 is provided with a coaxial stem 18 projecting into the bore 13 and preferably of tubular form to reduce the weight of the valve. This stem centers a helical compression spring 19 which seats at one end against the end head 16. The opposite end of this helical compression spring 19 seats against the annular shoulder 8 provided in the through bore of the sleeve 5.

The sleeve 5 is prevented from turning in the bores 13 and 14 by a pin 20 projecting radially from the sleeve 5 into a groove 21 in the bore 14. This pin is shown as held in place by a set screw 22. Three stop pins 24 are also arranged in the end of the sleeve 5 facing the end head 16 and these stop pins 24 engage this end head to limit the corresponding movement of the weight 5.

Gas under pressure, as from an oxygen supply of 70 p.s.i. (not shown) is supplied to an inlet fitting 25 secured in any suitable manner to the valve body 12 and which has a through passage 26 containing a filter 17. This fitting fits into the enlarged end 27 of a through bore, the reduced end 28 of which communicates with the bore 14.

Between the fitting 25 and the annular shoulder 29 provided by these enlarged and reduced ends of the bore 26, 28 is mounted a demand valve indicated generally at 30. This demand valve includes a stationary valve disk 31 having an axially extending rim 32 which fits against a second stationary valve disk 33 and provides a chamber 34 between these stationary valve disks. This chamber has an opening 35 registering with a passage 36, the latter discharging into a chamber 38 in a plunger casing 39. The stationary valve disk 33 is provided with a coaxial teat 40 having a through opening through which a stem 41 fixed to a valve head 42 extends, this valve head being cup-shaped with its rim bearing against the pressure side of the stationary valve disk 31 around the central opening 43 therethrough and through which the stem 41 also extends. A stop 44 on the stem 41 limits the movement of the head 42 away from its seat.

The stem 41 projects into a longitudinal slot 45 provided through the side wall of the sleeve weight 5. This slot is of predetermined length to tilt the valve stem 41 on predetermined longitudinal movement of the sleeve weight 5. To accommodate maximum movement of the valve stem 41 a diagonal slot 46 is provided in the side of the bore 28.

A poppet relief valve indicated generally at 50 connects with the bore 28. This relief valve comprises a body 51 having a threaded stem 52 screwed into the valve body 12 and having a bore 53 communicating with the bore 28. The outer end of this bore 53 is enlarged and has a central cross piece 54 which bridges the bore. In this cross piece 54 is slidingly mounted a pin 55 which is fast to a valve disk or head 56 which seats against an annular valve seat 58 to close the outer end of the bore 53. A cap 59 is screwed over the outer end of the valve body 51 and is apertured, as indicated at 60, to permit the escape of gas therethrough. A helical compression spring 61 is interposed between the cap 59 and the valve disk or head 56, this spring determining the pressure at which the relief valve 50 opens.

The pressuring gas is supplied to the suit bladder (not shown) through a nipple fitting 65 having a through bore 66 communicating with a cylinder 68 in a valve housing 69. In this cylinder 68 is fitted a piston 70 integral with a stem 71 which projects into the bore 66 but is consideraly smaller than this bore so that bladder pressure at the outer end of the bore 66 is effective against the piston 70. The piston 70 is integral with a second stem 72 which is fitted in a cylindrical bore 73 connecting the chamber 38 with the cylinder 68. The outer extremity of the stem 72 is in the form of an annular thin or feather edge which seats against a valve seat or disk 74. A helical compression spring 75 biases the piston 70 to the right, as viewed in Fig. 1, to unseat the stem 72 from the seat 74.

The stems 72, 71 have a through bore 77 and the stem 71 serves as the nozzle of an injector. For this purpose, in the unseated position of the stems 72, 71, the outer end of the stem 71 is in cooperative relation to a passage 76 leading laterally from the bore 66 to the bore 28. It will be seen that the effect of the discharge from the nozzle 71 is to draw gas through the passage 76 from the bores 28, 6 and 13 thereby to tend to bias the sleeve weight 5 to the right as viewed in Fig. 1 to open the demand valve 30.

The entire valve is referenced to suit pressure through a fitting 80 which connects with the suit capstans (not shown) which are pressurized during high altitude flying. In the event pressure suits are not used, the valve would be referenced to ambient and the fitting 80 connected with the atmosphere. Through a port 81 reference pressure is applied to an annular groove 82 at the end of the bore 13 opposite the end head. Accordingly reference pressure is applied to one side or the other of the enlarged end head 9 of the sleeve weight 8 depending upon its position. The side of the piston 70 from which the stem 72 projects is also referenced to suit pressure or ambient through the passage 83 connecting with the annular groove 82.

Means are provided for manually pressurizing the gravity bladder to any desired degree, these means being constructed as follows:

The numeral 85 represents a diaphragm secured across the open end of the bore 14 by a cylindrical extension 86 having an end head 88 provided with a large opening 89. The numeral 90 represents a manual push button having an enlarged rim 91 behind the end head 88 and held thereagainst by a helical compression spring 92. The press button 90 actuates a follower 93 secured to opposite sides of the diaphragm 85 and in position to press against the left hand end of the sleeve weight 5 and thereby to move this weight to open the demand valve 30.

*Operation*

The gravity valve is referenced, through the fitting 80, to suit pressure which at altitudes less than about 35,000 feet would be ambient pressure. If not used in conjunction with a pressurized suit it would be referenced to ambient pressure. With suit pressure at 80, this same pressure exists throughout the entire valve beyond the demand valve 30 as well as in the bladder (not shown) with which the fitting 65 is connected, the bore 66 of this fitting being connected by the passage 76, bore 28, slot 45, bores 6 and 13 and port 81 with the suit pressure fitting 80.

When the gravity valve goes into operation, as in pulling out of a dive, the deceleration moves the sleeve weight 5 to the right as viewed in Fig. 1 against the resistance of the helical compression spring 19. Following this movement the sleeve weight is returned by the preponderance of bladder pressure over the reference suit pressure plus the effect of the return spring 19. Thus with a deceleration force acting against the sleeve weight 5 it moves toward the end head 16 a proportionate amount. With such movement of the sleeve weight 5 sufficient to engage and move the demand valve stem 41 this stem and the demand valve head 42 is tipped a proportionate amount to admit a proportionate amount of high pressure gas, usually from the ship's oxygen supply, from the supply fitting 25 through the opening 43 into the demand valve chamber 34. It will be noted that with such movement of the sleeve weight the enlarged head 9 of the sleeve weight 5 slides over the annular groove 82 so that reference suit pressure is now impressed against the small area piston face 11 of the enlarged head 9 of the sleeve weight. From the chamber 34, the high pressure gas flows through the passage 36 into the chamber 38 and thence through the open end of the stem 72 and bore 77 to be discharged as a jet from the stem 71 into the bore 66 of the fitting 65 which is connected by a small diameter flexible tube with the bladder (not shown) laying against the lower part of the body of the aviator. This bladder pressure builds up rapidly as required to support the abdominal organs and counteract the greatly increased blood pressure in the lower part of the aviator's body. The rapidity of this build up of bladder pressure is increased by rendering the demand valve 30 partly self-energizing through the jet of high pressure gas being discharged from the stem 71. Thus this jet induces a suction of gas from the passage 76 which in turn reduces the pressure in the bores 28, 6, and 13 of the valve body and sleeve weight. With such reduction in pressure in the cylinder 13, the suit pressure behind the face 11 is increased in effectiveness to move the sleeve weight 5 further to the right as viewed in Fig. 1 thereby to tilt the valve stem 41 still more and to increase the flow of high pressure gas through the valve into the bladder. At the same time runaway self-energization of the demand valve is avoided by inertia of the sleeve weight 5 and the resistance of the helical compression spring 19.

It will be noted that by discharging high pressure gas, say 70 p.s.i., from the stem 71, the flexible hose leading to the bladder can be very small, this being of great importance in avoiding unnecessary bulkiness in the attire of the aviator and which bulkiness impedes his action.

When the bladder pressure has been built up to that required to compensate for the force imposed by the deceleration of the airplane, this increased pressure backs up through the large passage 76 to build up an equal pressure in the bores 28, 6 and 13 of the valve body and sleeve weight. This bladder pressure acts on both ends of the sleeve weight 5, and in acting on the enlarged head 9 thereof, moves the sleeve weight to the left due to the bladder pressure now being in excess of the opposing suit pressure acting against the small piston area 11 of the enlarged head of the sleeve weight. When the bladder pressure drives the sleeve weight back far enough to open the annular groove 82, the demand valve stem 41 has been released to close the demand valve and stop the build up of bladder pressure and at the same time the pressurized gas in the bladder rapidly dumps or escapes through the passage 76, bores 28, 6 and 13 and annular groove 82 into the suit pressure reference fitting 80. Accordingly both the pressure build up and the dumping of the bladder pressure is rapid.

When the excess bladder pressure is fully relieved, the entire valve beyond the demand valve head 42 is again at reference suit pressure which was the condition assumed at the start of this description of the operation.

If the sleeve weight 5 should stick in its demand valve opening position, loss of high pressure gas is prevented. Thus the demand valve 30 being capable of delivering, said, 300 liters per minute, a continued loss at this rate would be highly undesirable if the sleeve weight should become stuck. To avoid this, when the bladder pressure rises to a predetermined maximum, say, 10 p.s.i., this pressure is impressed on the right hand side of the piston 70 and moves it to the left since the opposite side of this piston is exposed at this time only to reference suit pressure through the passage 83 and closed annular groove 82 and which reference suit pressure would not exceed, say, 3 p.s.i. Under these conditions the feather edge of the stem 72 would be driven against the valve seat disk 74 to close off the supply of high pressure gas from the demand valve 30. Since the only place the high pressure gas from the demand valve 30 can escape is through the bore 77 of the piston 70 and its projecting stems 71 and 72, it is apparent that so blocking this bore prevents loss of high pressure oxygen.

It will also be noted that by pressing on the button 90 the sleeve weight is manually moved to open the demand valve 30 so that the gravity valve is under manual control if required.

The operation of the relief valve 50 is believed to be obvious from inspection.

It will particularly be noted that by applying reference suit pressure to the small piston area 11 of the sleeve weight, a long stroke of this sleeve weight is obtained with a very small effective piston area and weight. This small area 11 provides a very high weight to piston area ratio and with such small area permits of a light weight and hence light weight gravity valve.

From the foregoing it will be seen that the present gravity valve is light in weight, rapid in its response and reliable in operation and accomplishes the various objectives set forth.

I claim:

1. In a valve responsive to abrupt changes in speed, a valve body having a bore closed at its opposite ends, a weight slidable in said bore and having unequal areas at its opposite ends, an inlet for supplying gas under high pressure to one end of a passage through said body, an outlet in said body at the opposite end of said passage, valve means actuated by movement of said weight in one direction and supplying gas under high pressure from said inlet to said passage, means providing communication between said passage and opposite ends of said bore to impress said gas under high pressure simultaneously against opposite end faces of said weight, said weight having intermediate its ends a transverse face of smaller area than either of said weight end faces and facing in the opposite direction from said one direction, and means to impress a reference fluid pressure less than said high pressure against said transverse face.

2. The combination set forth in claim 1 wherein said weight is in the form of an open centered tubular sleeve.

3. The combination set forth in claim 2 wherein a helical compression spring urges said sleeve weight in said opposite direction.

4. The combination set forth in claim 2 wherein said reference pressure is supplied through a port in said valve body which, when said sleeve weight is in its extreme position in said one direction, is in communication with said transverse face, and when said sleeve weight is in its extreme position in said opposite direction is arranged beyond one end of said sleeve weight.

5. In a valve responsive to abrupt changes in speed, a valve body having coaxial large and small bores forming a continuation of each other, an open-ended tubular sleeve weight having an end part of reduced cross sectional area slidably fitted in said small bore and having an enlarged head slidingly fitted in said large bore, said body being provided with a passage separate from and alongside said bores, an inlet for supplying gas under high pressure to one end of said passage, an outlet for said gas at the other end of said passage, a valve seat across said passage and facing said inlet, a valve head held against said seat by the pressure of said gas at said inlet, a valve stem fast to said valve head and arranged to unseat said valve head from said seat, means operatively connecting said weight with said valve stem and actuated by movement of said weight in one direction to unseat said valve head, means providing communication between said passage on the downstream side of said valve head against opposite end faces of said weight, and means biasing said weight in the direction of said small bore.

6. The combination set forth in claim 5 wherein gas under a reference pressure less than said high pressure gas is impressed against the opposite side of said enlarged head from that against which said high pressure gas is impressed.

7. The combination set forth in claim 5 wherein said biasing means is in the form of a helical compression spring.

8. The combination set forth in claim 5 wherein said reference pressure is supplied through a port in said valve body and which in one extreme position of said sleeve weight is on one side of said enlarged head and in the other extreme position of said sleeve weight is on the other side of said enlarged head.

9. In a valve responsive to abrupt changes in speed, a valve body having a bore closed at its opposite ends, a weight slidable in said bore, an inlet for supplying gas under high pressure to one end of a passage through said body, an outlet in said body at the opposite end of said passage, valve means actuated by movement of said weight in one direction for supplying gas under high pressure from said inlet to said passage, a nozzle in said passage directed toward said outlet and through which nozzle said gas under high pressure passes, a conduit having one end in proximity to the discharge from said nozzle to be subject to the suction effect thereof, means providing communication between the other end of said conduit and the end of the bore toward which said weight moves in said one direction, and means biasing said weight in the opposite direction.

10. The combination set forth in claim 9 wherein said weight is in the form of an open ended sleeve having unequal areas at its opposite ends.

11. The combination set forth in claim 10 wherein reference fluid pressure of lower value than said high pressure is impressed on a restricted piston area of said sleeve weight to urge it in said one direction.

12. A valve responsive to abrupt changes in speed, comprising a valve body having coaxial large and small bores forming a continuation of each other and closed at their outer extremities, said large bore being provided adjacent said small bore with a pair of ports in permanent communication with each other, means supplying fluid under reference pressure to one of said ports, an open ended sleeve weight having an end part of reduced diameter fitting in said small bore and an enlarged annular head fitted in said large bore, an inlet for supplying gas under high pressure to one end of a passage through said body, an outlet in said body at the opposite end of said passage, valve means actuated by movement of said sleeve weight in the direction of said large bore for supplying gas under higher pressure than said reference pressure from said inlet to said passage, a nozzle in said passage directed toward said outlet and through which nozzle said gas under higher pressure passes, a conduit connecting said passage with the other of said ports, a second passage having one end in proximity to the discharge from said nozzle to be subject to the suction effect thereof, the other end of said second passage permanently communicating with said small bore, and means biasing said sleeve weight in the opposite direction.

13. In a valve responsive to abrupt changes in speed, a valve body having a bore closed at its opposite ends, a weight slidable in said bore, an inlet for supplying gas under high pressure to one end of a passage through said body, an outlet in said body at the opposite end of said passage, valve means actuated by movement of said weight in one direction for supplying gas under high pressure from said inlet to said passage, said passage being formed to provide a chamber, a second bore and a third bore of reduced diameter aligning with and leading from one end of said second bore to said chamber, a piston slidable in said second bore, a stem fixed to said piston and slidably fitted in said third bore, said piston and stem having a through passage through which said high pressure gas passes from said chamber to said other end of said second bore, and a seat in said chamber against which the end of said stem seats to close said passage when the back pressure from said outlet rises above a predetermined minimum.

14. The combination set forth in claim 13 wherein means responsive to movement of said weight in said one direction supplies fluid under reference pressure to said second bore on the side of said piston facing said inlet to said passage.

References Cited in the file of this patent

UNITED STATES PATENTS

| | | |
|---|---|---|
| 2,622,609 | Moller | Dec. 23, 1952 |
| 2,772,686 | Versoy | Dec. 4, 1956 |
| 2,789,556 | Clark | Apr. 23, 1957 |
| 2,823,687 | Gabriel | Feb. 18, 1958 |